(12) United States Patent
Gillanders et al.

(10) Patent No.: US 9,555,453 B2
(45) Date of Patent: *Jan. 31, 2017

(54) METHODS AND SYSTEMS FOR ABRASIVE CLEANING AND BARRIER COATING/SEALING OF PIPES

(71) Applicant: Pipe Restoration Technologies, LLC, Las Vegas, NV (US)

(72) Inventors: Larry Gillanders, Chilliwack (CA); Steve Williams, Stockton, CA (US); John Laborde, Placentia, CA (US)

(73) Assignee: Pipe Restoration Technologies, LLC, Las Vegas, NV (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/169,805

(22) Filed: Jan. 31, 2014

(65) Prior Publication Data

US 2014/0182622 A1    Jul. 3, 2014

Related U.S. Application Data

(60) Division of application No. 11/946,107, filed on Nov. 28, 2007, now Pat. No. 8,696,823, which is a
(Continued)

(51) Int. Cl.
*B08B 7/00*  (2006.01)
*B08B 9/057*  (2006.01)
(Continued)

(52) U.S. Cl.
CPC .............. *B08B 9/057* (2013.01); *B05D 7/222* (2013.01); *B24C 1/083* (2013.01); *B24C 3/327* (2013.01);
(Continued)

(58) Field of Classification Search
None
See application file for complete search history.

(56) References Cited

U.S. PATENT DOCUMENTS 1,890,164 A    12/1932   Rosenberger
2,087,694 A    7/1937    Malmros
(Continued)

FOREIGN PATENT DOCUMENTS

CA    2198103    3/1996
DE    3821558    12/1989
(Continued)

OTHER PUBLICATIONS

American Pipe Lining, Inc., In-Place Pipe Restoration, 2001, 9 pgs, online, retrieved on Oct. 25, 2005, retrieved from http://web.archive.org/web/20010801213356/www.ampipelining.com/index.html, 11 pages.
(Continued)

*Primary Examiner* — Eric Golightly
(74) *Attorney, Agent, or Firm* — Brian S. Steinberger; Law Offices of Brian S. Steinberger, P.A.

(57) ABSTRACT

Methods for abrasive cleaning, existing pipes before coating interior surfaces which extends the life of piping systems such as copper, steel, lead, brass, cast iron piping and composite materials. The method can include the steps of generating pressurized gas into pipes to generate a moving air stream, intermittently injecting separate spaced apart bursts of abrasive particles into the moving air stream with different cumulative amounts of the intermittent bursts of the abrasive particles that vary based on different piping diameters, cleaning interior wall surfaces of the pipes with the intermittent bursts of the particles, reducing at least one of burrs or interior lips in the interior wall surfaces of the pipes, with the intermittent bursts of the particles and removing
(Continued)

6 General Process Steps abrasive particles and debris caused by each one of the separate burst shots of the abrasive particles.

9 Claims, 7 Drawing Sheets

Related U.S. Application Data continuation-in-part of application No. 11/246,825, filed on Oct. 7, 2005, now Pat. No. 7,517,409, which is a division of application No. 10/649,288, filed on Aug. 27, 2003, now Pat. No. 7,160,574.

(60) Provisional application No. 60/406,602, filed on Aug. 28, 2002.

(51) Int. Cl.
| | |
|---|---|
| B05D 7/22 | (2006.01) |
| F16L 58/10 | (2006.01) |
| B24C 1/08 | (2006.01) |
| B24C 3/32 | (2006.01) |
| B05D 3/12 | (2006.01) |
| F16L 101/10 | (2006.01) |

(52) U.S. Cl.
CPC .............. *F16L 58/1009* (2013.01); *B05D 3/12* (2013.01); *F16L 2101/10* (2013.01); *Y10S 118/10* (2013.01); *Y10S 118/13* (2013.01)

(56) References Cited

U.S. PATENT DOCUMENTS

| | | | |
|---|---|---|---|
| 2,298,775 A | 10/1942 | Raiche | |
| 2,331,824 A | 10/1943 | Buckingham | |
| 2,497,021 A | 2/1950 | Sterns | |
| 3,139,704 A | 7/1964 | McCune | |
| 3,139,711 A | 7/1964 | Soderberg | |
| 3,151,418 A | 10/1964 | Powell | |
| 3,286,406 A | 11/1966 | Ashworth | |
| 3,287,148 A | 11/1966 | Hilbush | |
| 3,382,892 A | 5/1968 | Cerbin | |
| 3,385,587 A | 5/1968 | Smith | |
| 3,440,400 A | 4/1969 | Cotts | |
| 3,485,671 A | 12/1969 | Stephens | |
| 3,608,249 A | 9/1971 | Sullivan | |
| 3,727,412 A | 4/1973 | Marx | |
| 3,835,587 A | 9/1974 | Hall, Jr. | |
| 4,005,549 A | 2/1977 | Perry | |
| 4,117,308 A | 9/1978 | Boggs et al. | |
| 4,177,308 A | 12/1979 | Beeler | |
| 4,246,148 A | 1/1981 | Shimp et al. | |
| 4,255,468 A | 3/1981 | Olson | |
| 4,311,409 A | 1/1982 | Stang | |
| 4,314,427 A | 2/1982 | Stoltz | |
| 4,327,132 A | 4/1982 | Shinno | |
| 4,333,277 A | 6/1982 | Tasedan | |
| 4,454,173 A | 6/1984 | Koga | |
| 4,454,174 A | 6/1984 | Koga | |
| 4,505,613 A | 3/1985 | Koga | |
| 4,576,596 A | 3/1986 | Jackson et al. | |
| 4,579,596 A | 4/1986 | Murzyn | |
| 5,007,461 A | 4/1991 | Naf | |
| 5,017,258 A | 5/1991 | Brown et al. | |
| 5,045,352 A | 9/1991 | Mueller | |
| 5,046,289 A | 9/1991 | Bengel | |
| 5,085,016 A | 2/1992 | Rose | |
| 5,231,804 A | 8/1993 | Abbot | |
| 5,460,563 A | 10/1995 | McQueen | |
| 5,499,659 A | 3/1996 | Naf | |
| 5,622,209 A | 4/1997 | Naf | |
| 5,643,057 A | 7/1997 | Isaacson | |
| 5,707,702 A | 1/1998 | Brady, Jr. et al. | |
| 5,800,629 A | 9/1998 | Ludwig | |
| 5,915,395 A | 6/1999 | Smith | |
| 5,924,913 A | 7/1999 | Reimelt | |
| 5,936,022 A | 8/1999 | Freeman | |
| 5,950,681 A | 9/1999 | Reimelt | |
| 6,345,632 B1 | 2/2002 | Ludwig | |
| 6,397,895 B1 | 6/2002 | Lively | |
| 6,423,152 B1 | 7/2002 | Landaas | |
| 6,739,950 B1 | 5/2004 | Kruse | |
| 7,041,176 B2 | 5/2006 | Kruse | |
| 7,066,730 B2 | 6/2006 | Macaluso | |
| 7,160,574 B1 | 1/2007 | Gillanders | |
| 7,270,847 B2 | 9/2007 | Horn | |
| 7,517,409 B1 | 4/2009 | Gillanders et al. | |
| 7,605,195 B1 | 10/2009 | Ward et al. | |
| 7,771,542 B1 | 8/2010 | Hunt et al. | |
| 7,858,149 B2 | 12/2010 | Gillanders et al. | |
| 8,696,823 B1 * | 4/2014 | Gillanders | B08B 9/057 134/22.11 |
| 8,795,768 B2 | 8/2014 | Gillanders | |
| 2004/0132387 A1 | 7/2004 | Kruse | |
| 2004/0163684 A1 | 8/2004 | Hapke | |
| 2007/0128353 A1 | 6/2007 | Gillanders | |
| 2010/0047439 A1 | 2/2010 | Gillanders | |

FOREIGN PATENT DOCUMENTS

| | | |
|---|---|---|
| DE | 4404473 | 9/1995 |
| EP | 0299134 | 2/1988 |
| EP | 0393433 | 10/1990 |
| EP | 0551790 | 7/1993 |
| EP | 0637737 | 7/1994 |
| EP | 0634229 | 1/1995 |
| EP | 1674495 | 6/2006 |
| EP | 07716240.2 | 7/2009 |
| EP | 07716240 | 6/2011 |
| GB | 2140377 | 11/1984 |
| JP | 5822662 | 2/1983 |
| JP | 06126246 | 5/1994 |
| JP | 1036764 | 2/1998 |
| SU | 116040 | 11/1958 |
| WO | 2008088317 | 7/2008 |
| WO | PCT/US07/000072 | 8/2008 |
| WO | 2009014760 | 1/2009 |
| WO | 2011040899 | 4/2011 |

OTHER PUBLICATIONS

American Pipe Lining, Inc., In-Place Pipe Restoration, 2001,10 pgs, online, retrieved on Oct. 25, 2005, retrieved from http://web.archive.org/web/20030623154738/ampipelining.com/index.html.

American Pipe Lining, Inc., In-Place Pipe Restoration, 2001, 12 pgs., online, retrieved on Oct. 25, 2005, retrieved from http://www.web.archive.org/web/20030623154738/ampipelining.com/index.html, http://web.archive.org/web/20030604140015/ampipelining.com/process.index.html.

ACE DuraFlo—The Modern Pipe Renovation System, 2001, 9 pgs, online, retrieved on Oct. 20, 2005, retrieved from http://web.archive.org/web/20010518064023/http://aceduraflo.com.

ACE DuraFlo—The Modern Pipe Renovation System, 2001, 13 pgs., online, retrieved on Oct. 20, 2005, retrieved from http://web.archive.org/web/2011021003415/http://aceduraflo.com/index.html.

ACE DuraFlo—The Modern Pipe Renovation System, 2001, 11 pgs, online, retrieved on Oct. 20, 2005, retrieved from http://web.archive.org/web/2011129000953/http://aceduraflo.com/index.html.

ACE Duraflo—The Modern Pipe Renovation System, 2001, 13 pgs, online, retrieved on Oct. 20, 2005, retrieved from http://web.archive.org/web/20011214171031/http://aceduraflo.com/index.html.

ACE Duraflo—The Modern Pipe Renovation System, 2001, 11 pgs, online, retrieved on Oct. 20, 2005, retrieved from http://www.aceduraflo.com/index.html.

ACE DuraFlo Dust Collector Service Manual, 6 pgs, ACE DuraFlo Systems, LLC, 2001, Manual.

Brady, Fact Sheet from the Navy Pollution Prevention Conference on the Restoration of Drinking Water Piping with Nontoxic Epoxy Linings, 1995, 4 pgs, Navy Pollution Prevention Conference, Arlington, VA, EnviroSense.

(56) References Cited

OTHER PUBLICATIONS

Brady, et al., Epoxy Lining for Shipboard Piping Systems, Materials Chemistry Branch, Chemistry Division, NRL/MR/6120-94-7629, 1994, 29 pgs.

A-S Method, We are a person you are looking for A-S Method Pipe Rehabilitation System, Toyo Lining Co., Ltd., 1981, pp. 00789-00807.

Brady, Licensing Agreement between American Pipe Lining, Inc. and U.S. Navy, Aug. 1996, 19 pgs.

Technical Evaluation of Toyo Lining Co., Ltd., Jul. 1981, 35 pgs.

Patentees response to Reexam U.S. Appl. No. 95/001,717, filed Feb. 2, 2012, 79 pgs.

3rd party requesters response to Reexam U.S. Appl. No. 95/001,717, filed Mar. 2, 2012, 10 pgs.

Gillanders, Office Action Summary mailed Nov. 19, 2013 for U.S. Appl. No. 12/881,328, 10 pages.

Gillanders, U.S. Appl. No. 12/881,328, filed Sep. 14, 2010, Office Action Summary received from the U.S. Patent Office, mailed on Nov. 19, 2013, 10 pages.

U.S. Army Corps of Engineers, In Situ Epoxy Coating for Metallic Pipe Guidance, Public Works Technical Bulletin 420-49-35, 2001, U.S. Army Corps of Engineers, Washington, D.C., 32 pages.

Boyd et. al., Lead Pipe Rehabilitation and Replacement Techniques for Drinking Water Service: Review of Available and Emerging Technologies, Trenchless Tech, 2001, pp. 13-24, vol. 15, No. 1.

Interparty Reexam, U.S. Appl. No. 95/001,717, filed Aug. 17, 2011, 137 pages.

Gillanders, International Search Report, received from the Patent Office for PCT/US09/05514, 4 pages, Apr. 13, 2010.

Reexamination Request for U.S. Pat. No. 7,160,574 filed Jun. 14, 2015, 11 pages.

Brady, Robert F., Jr., Restoration of Drinking Water Piping With Nontoxic Epoxy Linings, published on Proceedings of the Tree-Service Environment Technology Workshop, "Enhancing Readiness Through Environmental Quality Technology" held in Hershey, PA on the May 20-22, 1996, 6 pages.

Brady, Robert F., Jr., Control of Lead in Drinking Water, Jul. 11, 1997, Naval Research Laboratory, 113 pages.

Information Disclosure Statement (IDS) for Reexamination Request for U.S. Pat. No. 7,160,574 filed Jul. 6, 2015, 2 pages.

Second Reexamination Request for U.S. Pat. No. 8,344,579 filed Jul. 10, 2015, 384 pages.

Gillanders, Appeal No. 2014-001128, Re-Exam U.S. Appl. No. 95/001,717, Re-Exam Filing Date Sep. 13, 2011, U.S. Pat. No. 7,858,149, Patent Owner's Request to Reopen Prosecution Pursuant to 37 C.F.R. 41 77 (b) (1) Filed Feb. 17, 2015, 49 pages.

Gillanders, Re-Exam U.S. Appl. No. 95/001,717, Re-Exam Filing Date Sep. 13, 2011, U.S. Pat. No. 7,858,149, Information Disclosure Statement by Applicant (Not for Submission under 37 CFR 1.99) filed Feb. 17, 2015, 4 pages.

Gillanders, U.S. Appl. No. 60/406,602, filed Aug. 28, 2002, 40 pages.

Gillanders, U.S. Appl. No. 13/676,784, filed Nov. 14, 2012, Amendment Response filed with PTO on Apr. 25, 2014, 13 pages.

ASTM International, Designation D4541-02, Standard test Method for Pull-Off Strength of Coatings Using Portable Adhesion Testers, 2014, 13 pages.

Gillanders, Re-Exam U.S. Appl. No. 95/001,717, Re-Exam Filing Date Sep. 13, 2011, U.S. Pat. No. 7,858,149, Electronic Acknowledgment Receipt, Feb. 17, 2015, 2 pages.

Gillanders, Re-Exam U.S. Appl. No. 95/001,717, Re-Exam Filing Date Sep. 13, 2011, U.S. Pat. No. 7,858,149, Decision on Request for Hearing mailed Jan. 16, 2015, 9 pages.

Gillanders, Re-Exam U.S. Appl. No. 90/013,429, Re-Exam Filing Date Jan. 19, 2015, U.S. Pat. No. 8,343,579, Request for Ex Parte Reexamination mailed Feb. 27, 2015, 15 pages.

Gillanders, Re-Exam U.S. Appl. No. 90/013,429, Re-Exam Filing Date Jan. 19, 2015, U.S. Pat. No. 8,343,579, 37 CFD 1.501 Information Disclosure Citation in a Patent, mailed Feb. 25, 2015, 2 pages.

Scotchkote 134 Fusion Bonded Epoxy Coating, Information, Properties and Test Results, 3M Corrosion Protection Products, 2000, 14 pages.

Vista Irrigation District Standard Specifications, Section 04100—Fusion-Bonded Epoxy Linings and Coatings, Vista Irrigation District (Rev. Mar. 1999), 7 pages.

Mark Schilling, Coating Adhesion Testing in Accordance with ASTM D4541—Sticky Business, Apr. 2004, pp. 18-19.

Gillanders, et. al., Methods and Systems for Coating and Sealing Inside Piping Systems, Utility U.S. Appl. No. 14/485,177, filed Sep. 12, 2014 (Divisional of '579 Patent in Reexam), Information Disclosure Statement (IDS) filed with PTO on May 20, 2015, 4 pages.

Order Denying Defendants' Motion for Partial Summary Judgment of Invalidity and Granting in Part Plaintiff's Motion for Summary Judgment of Validity, United States District Court Central District of California Southern Division, *Pipe Restoration Technologies, LLC, et al.* v. *Pipeline Restoration Plumbing, Inc. et al.*, Case No. SACV 1300499-CJC (RNBx), Jul. 8, 2014, 10 pages.

"Your Home's Plumbing System", by Tim Oglesby (Home Check America). This document is accessible at web.archive.org website at (version of Dec. 22, 2005): http://web.archive.Org/web/20051222132445/http://media.reliancenetwork.com/media/downloads/RemaxIL/200565101848.pdf. 8 pages.

"Water Pipeline Design Guidelines'" published by Saskatchewan Environment (dated Apr. 2004). This document is accessible at web.archive.org website at (version of Mar. 11, 2012): https://web.archive.Org/web/20120311170322/http://www.saskh2o.ca/DWBinder/EPB276WaterPipelineDesignGuidelines.pdf. 13 pages.

"High water pressure fact sheet", published by City of Olympia (Capital of Washington State). This document is accessible at web.archive.org website at (version of Nov. 12, 2012): https://web.archive.Org/web/20121102104045/http://olympiawa.gov/city"utiltities/drinking-water/conservation/~/media/Files/PublicWorks/WaterResources/PRV%20Flyer_2012.pdf. 2 pages.

"Water Pressure: What Causes It?", published by Columbus Water Works. This document is accessible at web,archive.org website at (version of Mar. 28, 2014): https://web.archive.Org/web/20140328093048/https://www.cwwga.org/documentlibrary/180_BILLSTUFFER%20-%20APRIL%202011%20-%20WATER%20PRESSURE.pdf. 2 pages.

"Codigo Tecnico de la Edification Salubridad", published by the Spanish Ministry of Public Works and Transportation (document in Spanish). The norms included in this document are of general application in Spain. This document is accessible at web.archive.org website at (version of Sep. 4, 2011): https://web.archive.Org/web/20110409122148/http://www.codigotecnico.org/cte/expor/sites/default/web/galerias/archivos/DB_HS_2009.pdf. 135 pages.

"Pressure Pipe System Ratings", published by Polypipe. This document is accessible at web.archive.org website at (version of Mar. 28, 2014): https://web.archive.Org/web/20140328093900/http://www.polypipe.com/cms/toolbox/Terrain_Pressure_HPPE_PIPE_SYSTEM_RATINGS.pdf. 5 pages.

"Ezeeflow Technical Manual", published by Ezeeflow. This document is accessible at web.archive.org website at (version of Sep. 7, 2012): https://web.archive.Org/web/20120907105306/http://www.globalhardwaregy.com/wp-upload/2011/06/Ezeeflow_Catalog_pdf. 25 pages.

Gillanders, U.S. Appl. No. 12/881,328, filed Sep. 14, 2010. Office Action Summary received from the U.S. Patent Office, mailed on Nov. 19, 2013, 10 pages.

Gillanders, U.S. Appl. No. 11/946,107, filed Nov. 28, 2007, Notice of Allowance received from the U.S. Patent Office, mailed on Feb. 27, 2014, 9 pages.

Gillanders, European Patent Application 15178498.0-1754 filed Jul. 27, 2015, Extended European Search Report mailed Nov. 27, 2015, 11 pages.

Gillanders, European Patent Application 12747878.2-1301 filed Aug. 10, 2012, Extended Supplementary European Search Report mailed Dec. 23, 2015, 14 pages.

NSF/ANSI 61-2002e, Section 5. Barrier Materials, 2002, pp. 22-29.

(56) References Cited

OTHER PUBLICATIONS

ANSI/AWWA C210-97, AWWA Standard for Liquid-Epoxy Coating Systems for the Interior and Exterior of Steel Water Pipelines, 1997, 24 pages.
Gillanders, Reexamination U.S. Appl. No. 90/013,429, filed Jul. 23, 2015 for Reexamination of U.S. Pat. No. 8,343,579 merged with Gillanders, Reexamination U.S. Appl. No. 90/013,548, filed Jul. 23, 2015 for Reexamination of U.S. Pat. No. 8,343,579 Official Action from PTO dated Nov. 23, 2015, 6 pages.
Gillanders, Reexamination U.S. Appl. No. 90/013,528, filed Jul. 6, 2015 for Reexamination of U.S. Pat. No. 7,160,574 Patent Owners Response to PTO Office Action; Response dated Feb. 9, 2016, 35 pages.
Gillanders, Reexamination U.S. Appl. No. 90/013,528, filed Jul. 6, 2015 for Reexamination U.S. Pat. No. 7,160,574, Official Action from PTO dated Apr. 1, 2016, 53 pages.
SSPC—The Society for Protective Coatings and NACE International Standard, Joint Surface Preparation Standard, SSPC-SP 5/NACE No. 1 White Metal Blast Cleaning, copyrighted SSPC: The Society for Protective Coatings, Pittsburg, PA. Sep. 1, 2000, pp. 55-59.
Gillanders, L., U.S. Appl. No. 13/676,784, filed Nov. 14, 2012, Response filed to U.S. Patent Office on Mar. 7, 2014, 41 pages.
Gillanders, L., U.S. Appl. No. 13/676,784, filed Nov. 14, 2012, Notice of Allowance received from the U.S. Patent Office mailed on Mar. 27, 2014, 13 pages.
Gillanders, L., U.S. Appl. No. 13/676,784, filed Nov. 14, 2012, Office Action Summary received from the U.S. Patent Office mailed Apr. 9, 2014, 11 pages.
NICITCP Session I Student Handbook, Abrasive Blast Cleaning, Mar. 1992, 6 pages.
ABSS Visual Comparator Guide Degrees of Cleanliness, Sep. 9, 2013, 1 page.
Demboski, Evolutions in U.S. Navy Shipboard Sewage and Graywater Programs, Nov. 1997, 17 pages.

\* cited by examiner

PROCESS FLOWCHART

SYSTEM SET UP

Water turbulence created by unburred joint or excess solder at joint

After ACE process, burr or excess solder is reduced or eliminated inplace, improving water flow, flow of coating material and reducing effects of water turbulence ie: excessive wear.

METHODS AND SYSTEMS FOR ABRASIVE CLEANING AND BARRIER COATING/SEALING OF PIPES

This invention is a Divisional of U.S. patent application Ser. No. 11/946,107, filed Nov. 28, 2007, which is a Continuation-In-Part of U.S. patent application Ser. No. 11/246,825 filed Oct. 7, 2005, now U.S. Pat. No. 7,517,409, which is a Divisional of U.S. patent application Ser. No. 10/649,288 filed Aug. 27, 2003, now U.S. Pat. No. 7,160,574 on Jan. 9, 2007, which claims the benefit of priority to U.S. Provisional Patent Application 60/406,602 filed Aug. 28, 2002. The entire disclosure of each of the applications listed in this paragraph are incorporated herein by specific reference thereto.

FIELD OF INVENTION

This invention relates to renovating of the interiors of pipes, and in particular to methods, systems and apparatus for abrasive cleaning and providing protective barrier coatings in a single operation to the interior walls of small diameter metal, PEX type, CPVC and plastic type pressurized pipes such as pressurized drain lines, hot water lines, cold water lines, potable water lines, natural gas lines, HVAC piping systems, fire sprinkler system lines, and the like, that are used in multi-unit residential buildings, office buildings, commercial buildings, and single family homes and the like.

BACKGROUND AND PRIOR ART

Over time building piping systems such as those used in commercial buildings, apartment buildings, condominiums, residential homes and the like, that have a broad base of users commonly develop problems with the building pipes such as with their water and plumbing pipes, and the like. Presently when a failure in a piping system, such as a leak occurs the repair method can involve a number of separate repair applications. Those repair applications often involve a specific repair to the area of failure such as replacing that section of pipe or the use of a clamping devise and a gasket. However, these popular types of repair applications can cause additional problems with the building piping system.

Problems such as low water flow, or discolored water can result from build-up of materials, and the like occurring inside the pipe that has not been properly cleaned. Additional problems associated with installing a cut pipe that has not been reamed or deburred can cause water turbulence as the water flows over an unreamed burr or lip left inside the pipe. Such problem can be a prime cause of erosion corrosion inside the pipes which quickens the deterioration and lifespan of the pipes.

Traditional techniques to correct for a potential leak, an actual leak, buildup or blockage or reducing or removing an unreamed lip or burr have included replacing some or all of a building's pipes. In addition to the large expense for the cost of the new pipes, additional problems with replacing the pipes can include the immense labor and construction costs that must be incurred for these projects. In addition the down time to the piping systems undergoing the repairs adds extra expense and discomfort to those needing to use the piping systems.

There are additional complications since most piping systems are located behind finished walls or ceilings, under floors, in concrete or underground. From a practical viewpoint simply getting to the problem area of the pipe to make the repair can create the largest problem. Reaching to the pipe for making repairs can require tearing up the building, cutting concrete and/or having to dig holes through floors, the foundation or the ground. These labor intensive repair projects can include substantial demolition of a buildings walls and floors in order to access the existing piping systems. For example, tearing out of the interior walls to access the pipes is an expected result of the demolition necessary to fix existing pipes.

Additionally, there are usually substantial time-consuming costs for removing the debris and old pipes from the worksite. With these projects both the cost of new pipes, the ancillary repair to the building and the additional labor to install these pipes require expensive and time consuming expenditures. Further, there are additional added costs for the materials and labor to replumb these new pipes along with the necessary wall and floor repairs that must be made after the repairs to clean up for the demolition effects.

Under current repair applications, just reaching at and fixing a pipe behind drywall is not completing the repair project. The drywall or wall covering surfaces must also be repaired, and just these types of repairs can be extremely costly. Additional expenses related to the repair or replacement of an existing piping system will vary depending primarily on the location of the pipe, the building finishes surrounding the pipe and the presence of hazardous materials such as asbestos encapsulating the pipe. Furthermore, techniques for making piping repair take considerable amounts of time which results in lost use and lost revenue from tenants and occupants of commercial type buildings since tenants cannot use the buildings until the repairs are done.

Finally, the current pipe repair techniques are usually only temporary. Even after encountering the cost to repair the pipe, the cost and inconvenience of tearing up walls or grounds and if a revenue property the lost revenue associated with the repair or replacement, the repaired and/or new pipe(s) will still be subject to the corrosive effects of water type fluids that flow through the pipes.

Governments and municipalities are now beginning to recognize and deal with corrosive effects of metal building piping systems. On Sep. 30, 2005, the State of California recognizing the negative effects of corrosive water on metallic piping systems signed into law Assembly Bill 1953, which reduces the allowable amount of lead in potable water delivery systems (such as through metal pipes) to 0.25%. The bill states: "No person shall introduce into commerce, for use in California, any pipe, pipe or plumbing fitting, or fixture intended to convey or dispense water for human consumption through drinking water or cooking that is not lead free, as defined in subdivision (e). This includes kitchen faucets, bathroom faucets, and any other end-use devices intended to convey or dispense water for human consumption through drinking or cooking."

Over the years many different attempts and techniques have been proposed for cleaning water type pipes with chemical cleaning solutions. See for example, U.S. Pat. No. 5,045,352 to Mueller; U.S. Pat. No. 5,800,629 to Ludwig et al.; U.S. Pat. No. 5,915,395 to Smith; and U.S. Pat. No. 6,345,632 to Ludwig et al. However, these systems generally require the use of chemical solutions such as liquid acids, chlorine, and the like, that must be run through the pipes as a prerequisite prior to any coating of the pipes.

Other systems have been proposed that use dry particulate materials as a cleaning agent that is sprayed from mobile devices that travel through or around the pipes. See for example, U.S. Pat. No. 4,314,427 to Stolz; and U.S. Pat. No.

5,085,016 to Rose. However, these traveling devices generally require large diameter pipes to be operational and cannot be used inside of pipes that are less than approximately 4 inches in diameter, and would not be able to travel around narrow bends. Thus, these devices cannot be used in small diameter pipes under 2 inches in diameter that also have sharp and narrow bends.

In some cases, compressed air carrying particles of abrasive material is blown through the pipe. Such a method is described, for example, in U.S. Pat. No. 5,622,209 to Naf and in U.S. Pat. No. 5,007,461 to Naf. In the Naf U.S. Pat. No. 5,007,461 the abrasive cleaning method described involved the use of compressed air alone with a continuous feed of abrasive material. And in the U.S. Pat. No. 5,622,209 to Naf, the interior of the pipe is subsequently coated with an adhesive resin, such as an epoxy resin, which is also applied by use of compressed air to blow it through the pipe.

The Naf patents described continuously blowing, large amounts of sand (approximately 200 Kg) that required extensive amounts air volume and pressure. Pre-drying took approximately 30 minutes, and a special separator was installed at the conduit outlet; the fine solid material exiting (apparently mainly calcium deposits and rust) entered a special separator. Then a feeding device for the abrasive medium (dry regular sand with a grain size of 2 to 4 mm) was installed in the conduit between the compressor and the air inlet. A separator with a cyclone separator with pressure gauge and regulating valve was installed at the air outlet. Then work was done for approximately 8 minutes at a mean overpressure of approximately 1 atmosphere at highest compressor output and greatest abrasive medium feed. At the end of blowing approximately 200 kg of abrasive medium had been blown through the conduit to be cleaned. At the end of blowing, the air exiting at the separator had a temperature of −50.degree. C. These elaborate blowing processes using great amounts of abrasive material are prone to problems.

These processes of using compressed air in this way can only be used on relatively small diameter pipes, and this cleaning technique easily results in blocking of the pipe, or major leaks in the pipe when weakened after cleaning by constant high pressure and large amounts of abrasive material being used. Also, the pipes are often not be adequately cleaned by such a processes when major frictional resistance occurs in the pipe system.

U.S. Pat. No. 5,924,913 of Reimelt attempts to overcome these problems by using a suction at one end of a section of pipe. Reimelt specifically discusses the problems with NOT wanting to use compressed air supplies for renovating pipes since they result in damage to the interior of the pipes, blockages in the pipes and result in pollution. See column 2, lines 39-62. However, the Reimelt technique of only using a suction (low pressure) at one end of a pipe section can also result in blockages and other problems. When an abrasive agent is repeatedly moved back and forth, it will gradually become mixed with the debris removed from the pipe surface, diluting or reducing the cleaning effect. Additionally, the Reimelt techniques require the use of heating devices such as wires that must be pulled or towed through pipe sections which adds additional expense and can also result in the dragged heating device damaging the interior of the pipes or even getting stuck in the pipes. Also, the Reimelt technique cannot be used with cleaning entire piping systems having bends and t-branches cannot be cleaned unless every pipe section is potentially taking apart and separately cleaned. Also, Reimelt cannot be used with small pipes that need to be cleaned since the suction and heating devices cannot easily pass through pipes smaller than approximately 2½ inches in diameter.

Thus, the need exists for solutions to the above problems where providing a processes of abrasive cleaning in small diameter pressurized pipes, up to 2 inches in diameter, that can be deburred, cleaned effectively and efficiently, in-place, without clogging the pipe during the cleaning process, with minimal damage to the pipe and without large quantities of abrasive material being used. A further application of a barrier coating and sealing leaks is accomplished in piping systems in a single operation, further protecting the piping system and all it's components from the effects of corrosion, thereby reducing the leaching of heavy metals such as lead into the water supply.

SUMMARY OF THE INVENTION

A primary objective of the invention is to provide methods, systems and devices for abrasive cleaning and preparation to the interior walls of the pipe and providing a protective barrier coating of pressurized pipes in buildings without having to physically remove and replace the pipes, where the pipes are cleaned, deburred, leaks sealed and the barrier coating is applied in a single operation.

A secondary objective of the invention is to provide methods, systems and devices for abrasive cleaning and repairing interior walls and sealing leaks, in a single operation in pipes by initially cleaning the interior walls of the pipes.

A third objective of the invention is to provide methods, systems and devices for abrasive cleaning and repairing interior walls and sealing leaks, in a single operation in pipes by applying a corrosion protection barrier coating to the interior walls of the pipes that provides a barrier coating and seals leaks in one operation.

A fourth objective of the invention is to provide methods, systems and devices for abrasive cleaning, repairing interior walls, sealing leaks, by applying a corrosion protection barrier coating to the interior walls of the pipes in a single operation, in pipes in buildings in a cost effective and efficient manner.

A fifth objective of the invention is to provide methods, systems and devices for abrasive cleaning, repairing interior walls, sealing leaks, by applying a corrosion protection barrier coating to the interior walls of the pipes in a single operation, in pipes which is applicable to small diameter piping systems up to approximately 2 inches in diameter in piping systems made of various materials such as galvanized steel, black steel, lead, brass, copper or other materials such as CPVC(Chlorinated Polyvinyl Chloride) type, PVC (polyvinyl chloride) type, PEX (cross-linked polyethylene) type and composites including plastics, as an alternative to pipe replacement or repair.

A sixth objective of the invention is to provide methods, systems and devices for abrasive cleaning, repairing interior walls, sealing leaks in pipes, by applying a corrosion protection barrier coating to the interior walls of the pipes in a single operation which is applied to pipes, "in place" or insitu minimizing the need for opening up walls, floors ceilings, or grounds.

A seventh objective of the invention is to provide methods, systems and devices for abrasive cleaning, repairing interior walls, sealing leaks in pipes, by applying a corrosion protection barrier coating to the interior walls of the pipes in a single operation, which minimizes the disturbance of asbestos lined piping or walls/ceilings that can also contain lead based paint or other harmful materials.

An eighth objective of the invention is to provide methods, systems and devices for abrasive cleaning, repairing interior walls, sealing leaks in pipes, by applying a corrosion protection barrier coating to the interior walls of the pipes in a single operation, where once the existing piping system is restored with a durable epoxy barrier coating the common effects of corrosion from water passing through the pipes will be substantially delayed if not stopped entirely.

A ninth objective of the invention is to provide methods, systems and devices for abrasive cleaning, repairing interior walls, sealing leaks in pipes, by applying a corrosion protection barrier coating to the interior walls of the pipes in a single operation, to clean out blockage where once the existing piping system is restored, users will experience an increase in the flow of water, which reduces the energy cost to transport the water. Additionally, the barrier epoxy coating leak sealant being applied to the interior walls of the pipes can create enhanced hydraulic capabilities again giving greater flow of water with reduced energy costs.

A tenth objective of the invention is to provide methods, systems and devices for abrasive cleaning, repairing interior walls, sealing leaks in pipes, by applying a corrosion protection barrier coating to the interior walls of the pipes in a single operation, where customers benefit from savings in time associated with restoration of an existing piping system.

An eleventh objective of the invention is to provide methods, systems and devices for abrasive cleaning, repairing interior walls, sealing leaks in pipes, by applying a corrosion protection barrier coating to the interior walls of the pipes in a single operation, where customers benefit from the economical savings associated with the restoration and in-place leak repair of an existing piping system, since walls, ceilings, floors, and/or grounds would not need to be broken and/or cut through.

A twelfth objective of the invention is to provide methods, systems and devices for abrasive cleaning, repairing interior walls, sealing leaks in pipes, by applying a corrosion protection barrier coating to the interior walls of the pipes in a single operation, where income producing commercial properties experience savings by remaining commercially usable, and any operational interference and interruption of commercial income-producing activities is minimized.

A thirteenth objective of the invention is to provide methods, systems and devices for abrasive cleaning, repairing interior walls, sealing leaks in pipes, by applying a corrosion protection barrier coating to the interior walls of the pipes in a single operation, where health benefits accrue, as the water to metal contact will be stopped by a barrier coating thereby preventing the leaching of metallic and potentially other harmful products from the pipe into the water supply such as but not limited to lead from solder joints and from lead pipes, and any excess leaching of copper, iron and lead.

A fourteenth objective of the invention is to provide methods, systems and devices for abrasive cleaning, repairing interior walls, sealing leaks in pipes, by applying a corrosion protection barrier coating to the interior walls of the pipes in a single operation where the pipes are being restored and repaired, in-place, thus causing less demand for new metallic pipes, which is a non-renewable resource.

A fifteenth objective of the invention is to provide methods, systems and devices for abrasive cleaning, repairing interior walls, sealing leaks in pipes, by applying a corrosion protection barrier coating to the interior walls of the pipes in a single operation, using a less intrusive method of repair where there is less building waste and a reduced demand on expensive landfills.

A sixteenth objective of the invention is to provide methods, systems and devices for abrasive cleaning, repairing interior walls, sealing leaks in pipes, by applying a corrosion protection barrier coating to the interior walls of the pipes in a single operation, where the process uses specially filtered air that reduces possible impurities from entering the piping system during the process.

A seventeenth objective of the invention is to provide methods, systems and devices for abrasive cleaning, repairing interior walls, sealing leaks in pipes, by applying a corrosion protection barrier coating to the interior walls of the pipes in a single operation, where the equipment package is able to function safely, cleanly, and efficiently in high customer traffic areas.

An eighteenth objective of the invention is to provide methods, systems and devices for abrasive cleaning, repairing interior walls, sealing leaks in pipes, by applying a corrosion protection barrier coating to the interior walls of the pipes in a single operation where the equipment components are mobile and maneuverable inside buildings and within the parameters typically found in single-family homes, multi unit residential buildings and various commercial buildings.

A nineteenth objective of the invention is to provide methods, systems and devices for abrasive cleaning, repairing interior walls, sealing leaks in pipes, by applying a corrosion protection barrier coating to the interior walls of the pipes in a single operation, where the equipment components can operate quietly, within the strictest of noise requirements such as approximately seventy four decibels and below when measured at a distance of approximately several feet away.

A twentieth objective of the invention is to provide methods, systems and devices for abrasive cleaning, repairing interior walls, sealing leaks in pipes, by applying a corrosion protection barrier coating to the interior walls of the pipes in a single operation where the barrier coating leak sealant material is applied to a variety of piping environments, and operating parameters such as but not limited to a wide temperature range, at a wide variety of airflows and air pressures, and the like.

A twenty first objective of the invention is to provide methods, systems and devices for abrasive cleaning, repairing interior walls, sealing leaks in pipes, by applying a corrosion protection barrier coating to the interior walls of the pipes in a single operation where the barrier coating leak sealant material and the process is functionally able to deliver turnaround of restored piping systems to service within approximately twenty four hours or less.

A twenty second objective of the invention is to provide methods, systems and devices for abrasive cleaning, repairing interior walls, sealing leaks in pipes, by applying a corrosion protection barrier coating to the interior walls of the pipes in a single operation, where the barrier coating material is designed to operate safely under NSF (National Sanitation Foundation) Standard 61 criteria in domestic water systems, with adhesion characteristics within piping systems in excess of approximately 400 PSI.

A twenty third objective of the invention is to provide methods, systems and devices for abrasive cleaning, repairing interior walls, sealing leaks in pipes, by applying a corrosion protection barrier coating to the interior walls of the pipes in a single operation where the barrier coating material is designed as a long-term, long-lasting, durable solution to pipe corrosion, pipe erosion, pinhole leak repair and related water damage to piping systems where the barrier coating extends the life of the existing piping system.

A twenty fourth objective of the invention is to provide methods, systems and devices for both cleaning and coating interiors and leak sealing, the interior of pipes having diameters of up to approximately 2 inches using dry particulates, such as sand and grit, prior to coating the interior pipe walls.

A twenty fifth objective of the invention is to provide methods, systems and devices for abrasive cleaning, coating interiors and sealing leaks of pipes having diameters of up to approximately 2 inches, in or around buildings, without having to section off small sections of piping for abrasive cleaning, coating and leak sealing applications.

A twenty sixth objective of the invention is to provide methods, systems and devices for abrasive cleaning the interiors of an entire isolated piping system in a building in a single pass run operation.

A twenty seventh objective of the invention is to provide methods, systems and devices for applying a barrier coating and leak sealing compound to the interiors of an entire isolated piping system in a building in a single pass run operation.

A twenty eighth objective of the invention is to provide methods, systems and devices for abrasive cleaning, of pipes having diameters of approximately ⅜ of an inch up to approximately 2 inches, in or around buildings, without having to section off small sections of piping for abrasive cleaning, where the abrasive cleaning reduces or eliminates the lip or burr associated with unreamed pipe. i.e.: deburring installed pipe.

A twenty ninth objective of the invention is to provide methods, systems and devices for abrasive cleaning the inside walls of piping systems having bends of up to approximately ninety degrees and branches, such as t-branches coming out from the pipes, using a compressed gas source at one end in combination with a vacuum generator at another end of the piping system so that the entire system can be cleaned in a single pass run.

A thirteenth objective of the invention is to provide methods, systems and devices for barrier coating and leak sealing the inside walls of piping systems having bends of up to approximately ninety degrees and branches, such as t-branches coming out from the pipes, using a compressed gas source at one end in combination with a vacuum generator at another end of the piping system so that the entire system can be cleaned in a single pass run.

The novel method and system of abrasive cleaning during pipe restoration prepares small diameter piping systems such as those within the diameter range of up to approximately 2 inches which can include straight and bent sections of piping and t-branches for the application of a protective barrier coating leak sealant.

The novel method of abrasive cleaning and prepares the piping system for application of a barrier coating and leak repair, in a single operation and can be applied to potable water lines, natural gas lines, HVAC piping systems, hot water lines, cold water lines, pressurized drain lines, and fire sprinkler systems.

The novel method of abrasive cleaning allows for a method of abrasive cleaning in pressurized pipes up to 2 inches in diameter that reduces the amount of abrasive material required, reduces the physical impact and damage to the interior pipe wall and reduces clogging of abrasive material and debris in the pipe, during the cleaning stage.

The novel method of abrasive cleaning allows for a method of abrasive cleaning in pressurized pipes up to 2 inches in diameter that reduces or eliminates the unreamed lip inside an unreamed or improperly reamed pipe.

The novel method of abrasive cleaning with the use of a vacuum air filter reduces the effects of friction loss in small diameter pipes up to 2 inches, enhancing exiting of the abrasive material and debris and enhancing impact effectiveness of the abrasive material.

The novel use of the vacuum air filter used without the compressor enhances the drying of the pipe, during the pre cleaning drying stage, enhances the release of spent abrasive and debris during the cleaning stage and enhances the drying of the barrier coating, during the drying stage.

The novel method of abrasive cleaning and application of an epoxy barrier coating leak sealant is applied to pipes right within the walls eliminating the traditional and expected destruction of the walls that is usually associated with a re-piping job. Typically a piping system or section of pipe can be isolated and the restoration of the system or section of pipe can be completed in less than one to four days (depending upon the building size and type of application) with piping fluid flow (such as water) restored within less than approximately 24 to approximately 96 hours.

For most applications, there are no walls to cut, no large piles of waste, no dust and virtually no lost use of the building. Entire building piping systems can be cleaned within one run through pass of using the invention. Likewise, an entire building piping system can be cleaned, coated and leaks sealed within one single pass operation as well.

Once cleaned, the applied epoxy coating not only seals the leak but creates a barrier coating on the interior of the pipe in the same operation. The application process and the properties of the epoxy coating ensure the interior of the piping system is fully coated and leaks repaired.

Currently, there are primarily three types of metallic piping systems that are commonly used in the plumbing industry: copper, steel and cast iron. New steel pipes are treated with various forms of barrier coatings to prevent or slow the effects of corrosion.

A common barrier coating used on steel pipe is the application of a zinc based barrier coat commonly called galvanizing. New copper pipes usually have no barrier coating protection. For years copper pipes were thought to be corrosion resistant offering a lifetime trouble free use as a piping system.

Under limited circumstances that involved a combination of factors of which the chemistry of water and installation practices a natural occurring barrier coating could sometimes form on the inside of copper pipes which would act as a barrier coating, protecting the copper piping system against the effects of corrosion from the water. However, in recent history, due to changes in the way drinking water is being treated and changes in installation practices, these natural occurring barrier coatings on the inside of copper pipes are not being formed or if it was formed it is now being washed away. In either case without an adequate natural occurring barrier coating, the copper pipe is exposed to the effects of corrosion/erosion, which can result in premature aging and failure of the piping system, most commonly referred to as a pinhole leak.

With galvanized pipe the zinc coating wears away leaving the pipe exposed to the effects of the corrosive activity of the water. This results in the pipe rusting and eventually failing.

The invention can also be used with piping systems having plastic pipes, PEX (cross-linked polyethylene) type pipes, CPVC(Chlorinated Polyvinyl Chloride) type pipes, PVC (polyvinyl chloride) type pipes, composite material, and the like.

The novel method and system of abrasive cleaning and corrosion control by the application of an epoxy barrier coating and sealant can be applied to existing piping systems in-place, in the same operation.

The invention includes novel methods and equipment for abrasive cleaning and providing barrier coating corrosion and repair methods for sealing leaks for the interior walls of small diameter piping systems in the same operation.

The novel process method and system of abrasive cleaning and internal leak repair and corrosion control includes at least three basic steps: Air Drying a piping system to be serviced; profiling the piping system using an abrasive cleaning agent; and applying the barrier coating leak sealant to selected coating thickness layers inside the pipes.

The novel invention can also include two additional preliminary steps of: diagnosing problems with the piping system to be serviced, and planning and setting up the barrier coating leak repairs project onsite. Finally, the novel invention can include a final end step of evaluating the system after applying the barrier coating leak repair and re-assembling the piping system.

A preferred method of cleaning out pipe systems, can include the steps of generating pressurized gas into one end of a piping system having pipes, intermittently injecting bursts of abrasive particles into the pressurized gas into the end of the piping system, cleaning interior wall surfaces of the pipes with the intermittent bursts of the abrasive particles, reducing burrs, interior lips and excess seam joint edges in the interior wall surfaces of the pipes, and generating a vacuum suction at another end of the piping system to remove the abrasive particles and debris caused by the cleaning of the interior walls of the pipes.

The pipes can be small pipes having diameters of approximately ⅜ of an inch to approximately 2 inches, and preferably diameters of approximately ⅜ of an inch to approximately 1¾ inches. The pipes can be metal pipes such as copper pipes and steel pipes, as well as other types of pipes such as but not limited to CPVC(Chlorinated Polyvinyl Chloride) type, PVC (polyvinyl chloride) type, PEX (cross-linked polyethylene) type and composites including plastics.

The intermittent bursts can include introducing a cumulative amount between approximately 0.15 kg to less than 5 kg of abrasive particulates per a piping length of between approximately ⅓ m to approximately 100 m.

For pipes having diameters of between approximately ⅜ inch to approximately 1 inch, the cumulative amount of the abrasive particles can be between approximately 0.15 kg to less than approximately 3 kg.

For pipes having diameters of between approximately 1¼ inches to approximately 1¾ inches, the cumulative amount of the abrasive particles can be between approximately 0.5 kg to less than 5 kg.

For pipes having diameters of between approximately 1¾ inches to approximately 2 inches, the cumulative amount of the abrasive particles can be between approximately 0.5 kg to less than 5 kg.

The method can include cleaning the interior walls of the pipes while the pipes have a temperature of between approximately 25 C to approximately 40 C.

For cleaning copper pipes, the abrasive particulates can be selected from at least one of: Silica, Garnett and Aluminum Oxide, with Garnet and Aluminum Oxide are most preferable since Aluminum Oxide is hard and Garnet is readily available and is environmentally desirable. The mesh size for particulates for copper pipes can be a range between 12 to 45 mesh sizes.

For cleaning steel pipes, the abrasive particles can be selected from at least one of: Silica, Garnett, Silicon Carbide and Aluminum Oxide, with Silica, Silicon Carbide and Aluminum would be most preferable in view of the their hardness for steel pipes. The mesh size for particulates for steel pipes can be a range between 12 to 60 mesh sizes.

With a piping diameter of approximately ½ inch, the air pressure can be approximately 2 to approximately 6 bar, and the abrasive particulates per shot are approximately 25 to approximately 80 grams.

With a piping diameter of approximately ⅝ of an inch, the air pressure can be approximately 2 to approximately 6 bar, and the abrasive particulates per shot are approximately 40 to approximately 120 grams.

With a piping diameter of approximately 1 inch, the air pressure generated can be approximately 2 to approximately 6 bar, and the abrasive particulates per shot are approximately 60 to approximately 160 grams.

With a piping diameter of approximately 1½ of an inch, the air pressure generated can be approximately 3 to approximately 7 bar, and the abrasive particulates per shot are approximately 75 to approximately 200 grams.

With a piping diameter of approximately 1¾ of an inch, the air pressure generated can be approximately 3 to approximately 7 bar, and the abrasive particulates per shot are approximately 75 to approximately 200 grams.

The novel method can also include the steps of coating the interior walls of the cleaned piping system with a barrier coating leak sealant with the compressed air source and the vacuum source attached to the piping system.

A preferred system of cleaning out building pipe systems having pipes with bends of approximately 90 degrees and t-branches would include a generator for generating pressurized/compressed gas into one end of a piping system, a source for intermittently injecting bursts of abrasive particles into the pressurized gas and into the end of the piping system, the intermittent bursts for cleaning interior wall surfaces of the pipes and reducing burrs, interior lips and excess seam joint edges in the interior wall surfaces of the pipes, and a vacuum source for generating a vacuum suction at another end of the piping system to remove the abrasive particles and debris caused by the cleaning of the interior walls of the pipes. Another source can be added for coating the interior walls of the cleaned pipes with a barrier coating using the pressurized/compressed gas generator and vacuum source.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This invention is a Continuation-In-Part of U.S. patent application Ser. No. 11/246,825 filed Oct. 7, 2005, which is a Divisional of U.S. patent application Ser. No. 10/649,288 filed Aug. 27, 2003, now issued as U.S. Pat. No. 7,160,574 on Jan. 9, 2007, which claims the benefit of priority to U.S. Provisional Patent Application 60/406,602 filed Aug. 28, 2002, all of which are assigned to the same assignee as the subject invention and all of which are incorporated by reference.

Figure 1:
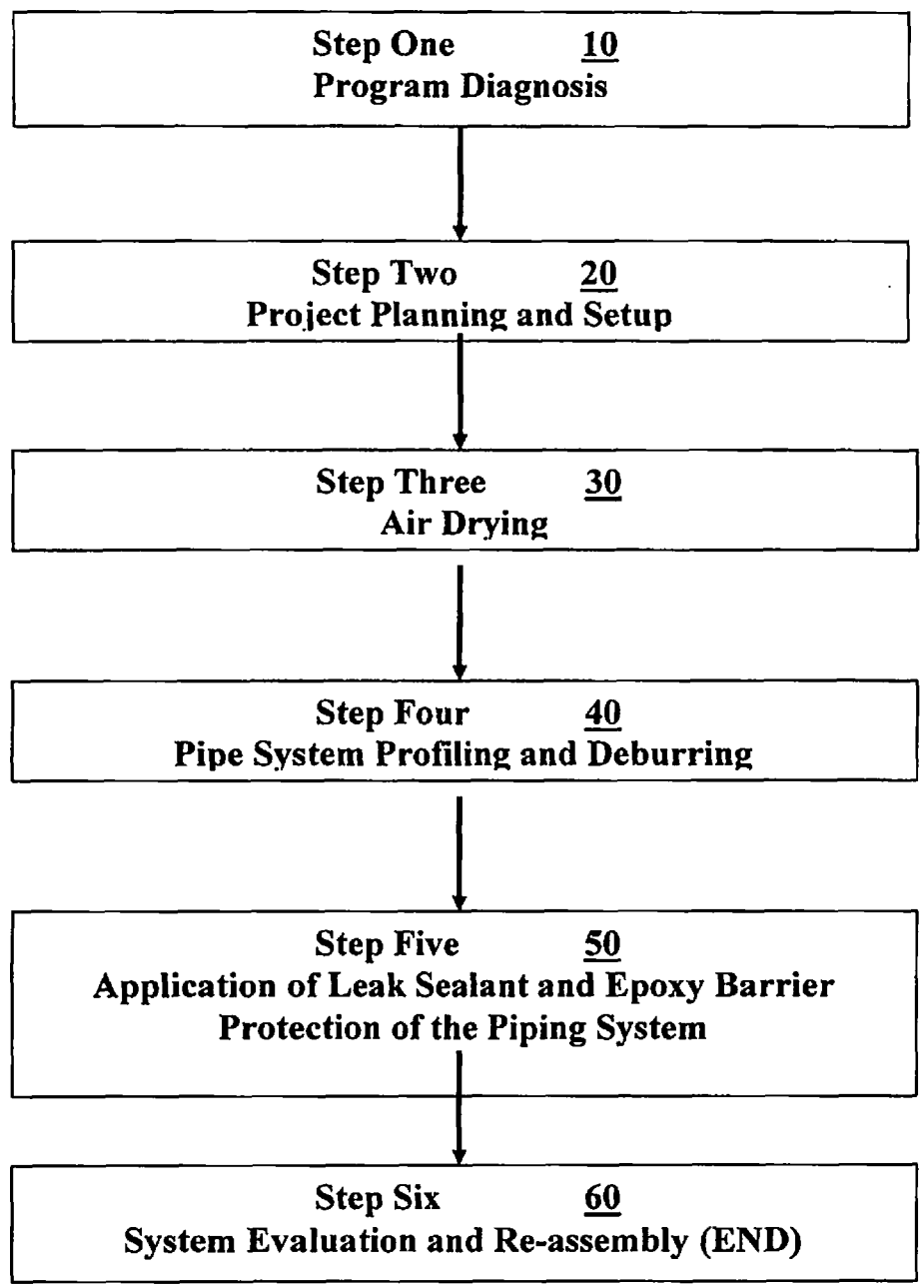
FIG. 1 shows the general six steps that is an overview for profiling and abrasively cleaning interior walls of pipes and applying the barrier coating leak sealant to the walls.
Figure 2A:
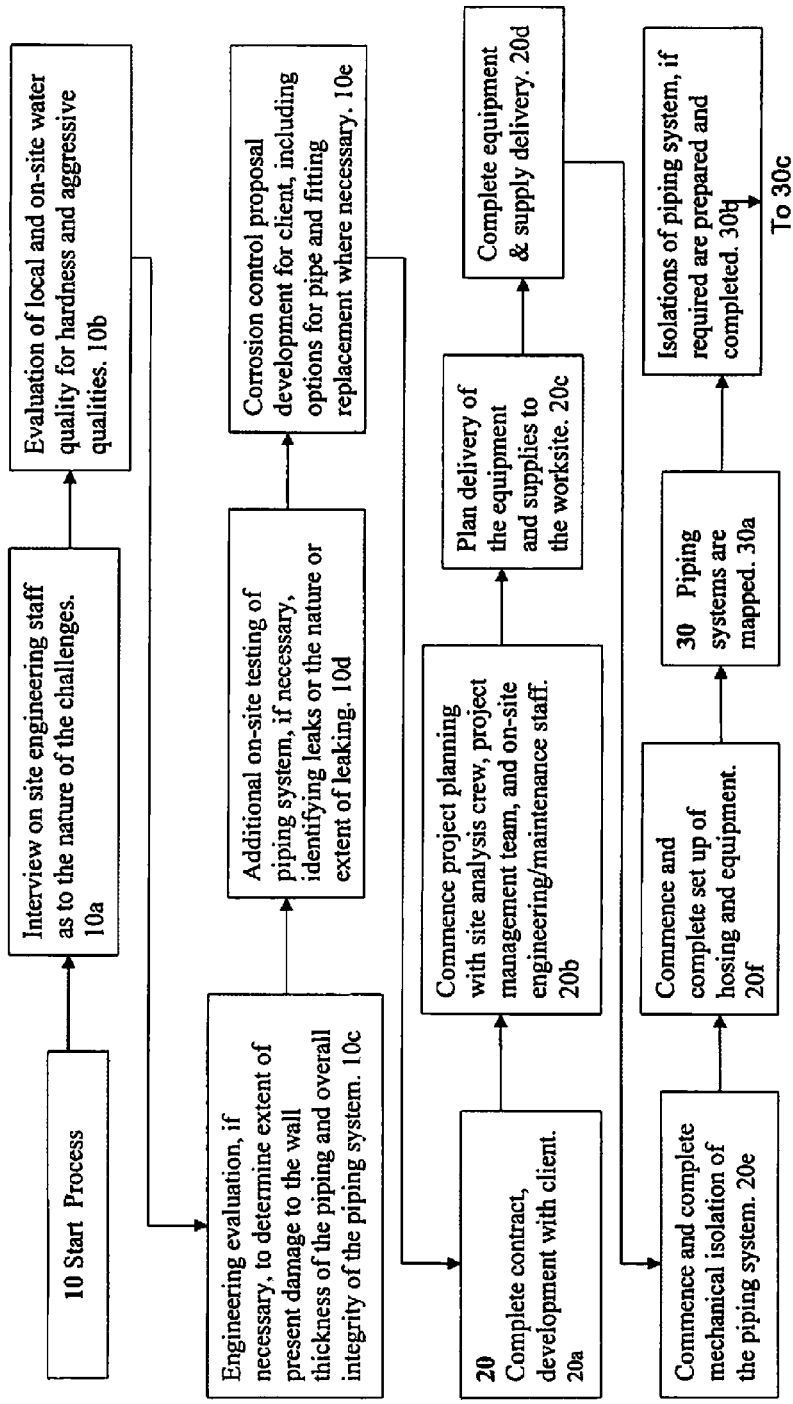
FIGS. 2A, 2B, 2C and 2D shows a detailed process flowchart using the steps of FIG. 1 for providing the abrasive cleaning and applying the barrier coating leak sealant.
Figure 2B:
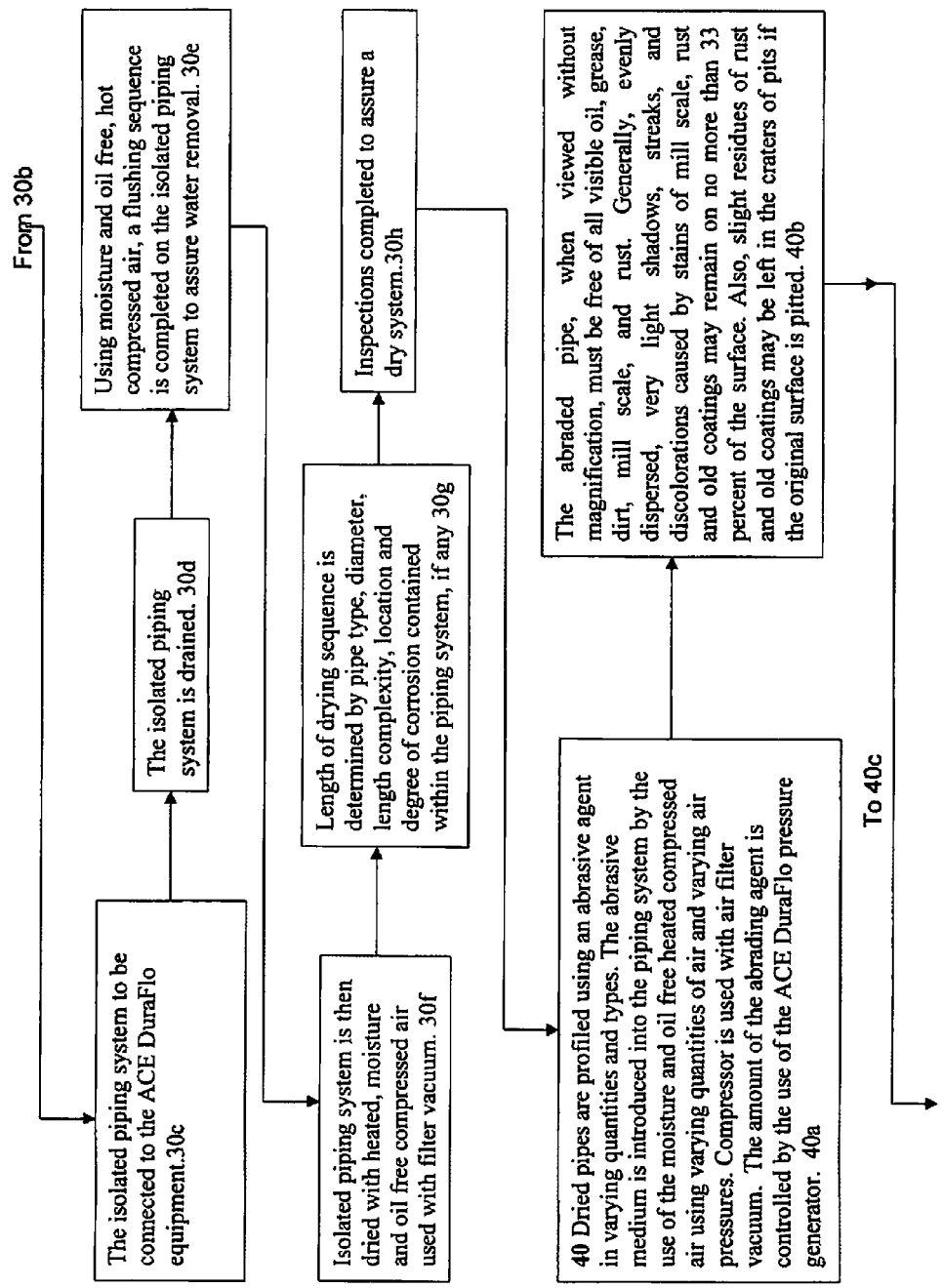
Figure 2C:
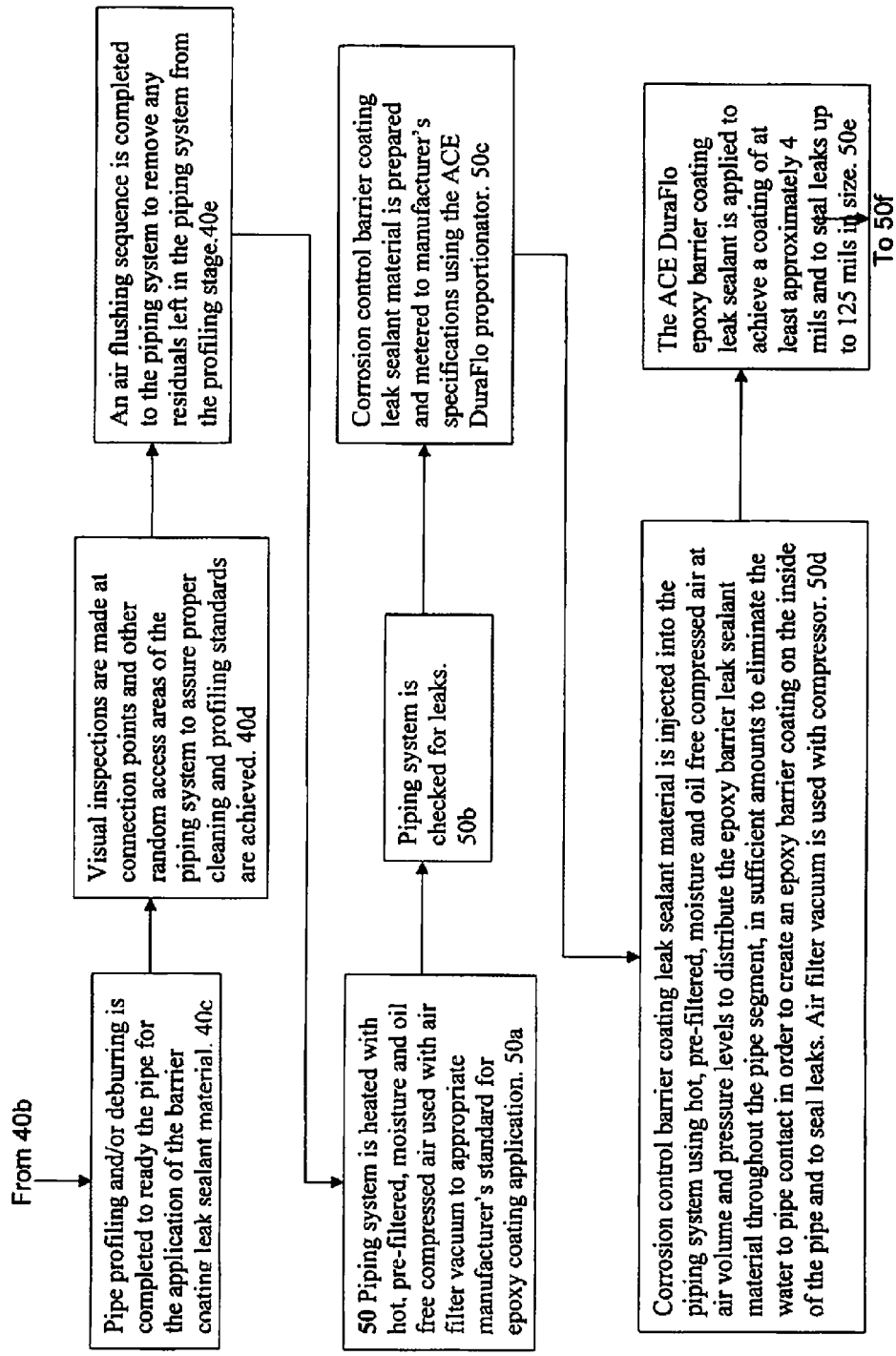
Figure 2D:
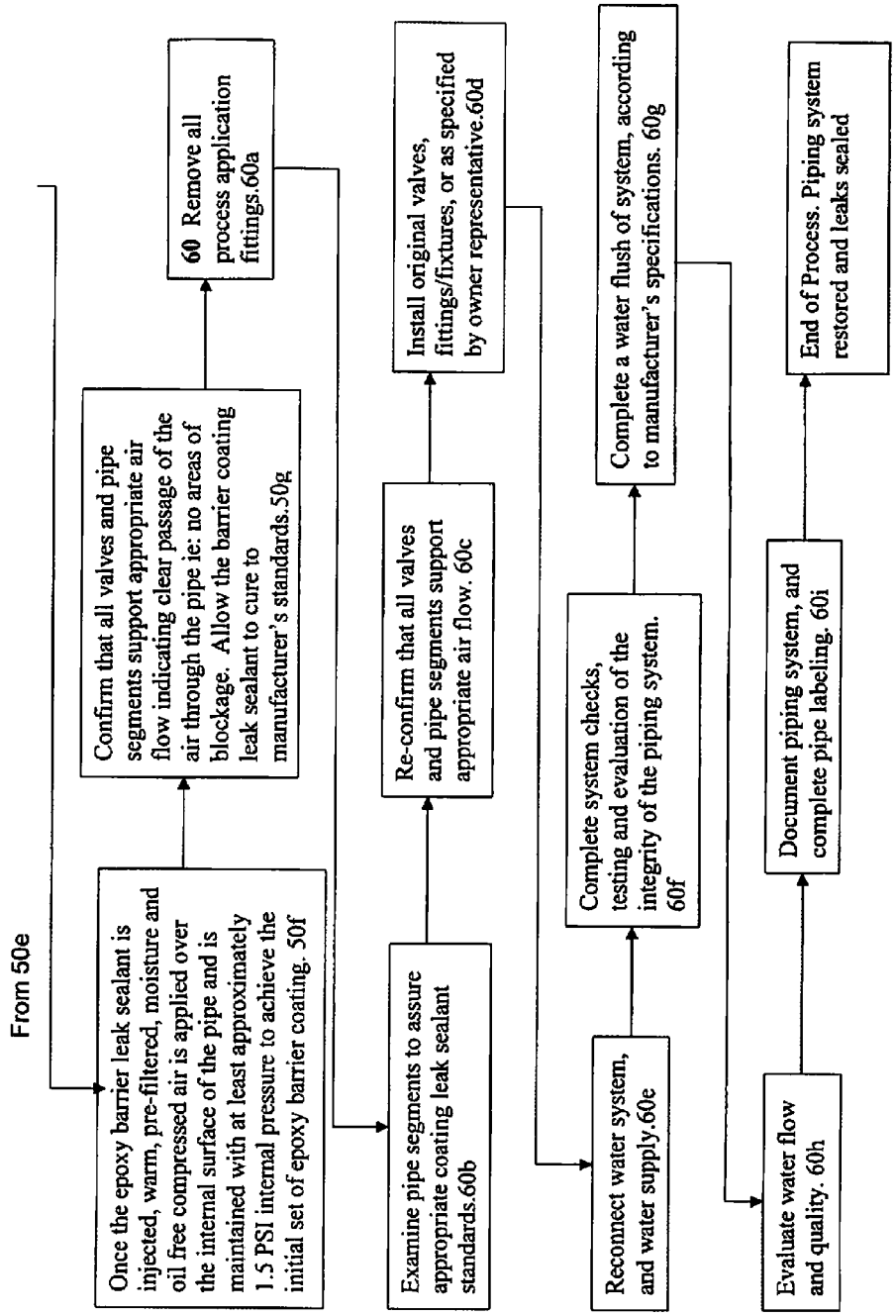

FIG. 1 shows the general six steps for a project overview for applying the barrier coating leak sealant to an existing piping system, which include step one, 10 program diagnosis, step two, 20 project planning, step three, 30 drying piping system, step four 40, profiling and deburring the piping system, step five, 50 applying barrier coating leak sealant to the interior walls of the pipes in the piping system, and final step six 60 evaluation and return to operation of the piping system.

Step One—Problem Diagnosis 10

For step one, 10, several steps can be done to diagnose the problem with a piping system in a building, and can include:
 (a) Interview onsite engineering staff, property managers, owners or other property representatives as to the nature of the current problem with the piping system.
 (b) Evaluation of local and on-site water chemistry being used in the piping system for hardness and aggressive qualities.
 (c) Engineering evaluation, if necessary, to determine extent of present damage to the wall thickness of the piping and overall integrity of the piping system.
 (d) Additional on-site testing of piping system, if necessary, identifying leaks or the nature or extent of leaking.
 (e) Corrosion control, leak sealing proposal development for client, including options for pipe and fitting replacement where necessary.

After completion of step one, 10, the project planning and setup step 20 can be started.

Step Two—Project Planning and Setup 20

For step two, 20, several steps can be followed for planning and setup for restoring the integrity of the piping system in a building, and can include:
 (a) Complete contract development with client, after the diagnosis contract has started.
 (b) Commence project planning with site analysis crew, project management team, and on-site engineering/maintenance staff.
 (c) Plan delivery of the equipment and supplies to the worksite.
 (d) Complete equipment and supply delivery to worksite.
 (e) Commence and complete mechanical isolation of the piping system.
 (f) Commence and complete set up of hosing and equipment.

Step Three—Air Drying—Step 1 Method of Corrosion Control and Leak Repair 30

For step three, 30, the piping system to be prepared for the coating by drying the existing pipes, and can include:
 (a) Piping systems are mapped.
 (b) Isolation of piping systems or pipe sections are prepared and completed.
 (c) The isolated piping system to receive the barrier coating leak sealant is adapted to be connected to the barrier coating equipment.
 (d) The isolated pipe section or system is drained of water.
 (e) Using moisture and oil free, hot compressed air, a flushing sequence is completed on the piping system to assure water is removed.
 (f) Piping system is then dried with heated, moisture and oil free compressed air. The piping system is heated in the approximate range of approximately 25 to approximately 40 degrees Celsius
 (g) Length of drying sequence is determined by pipe type, diameter, length complexity, location and degree of corrosion contained within the piping system, if any.
 (h) Exiting debris is captured with use of an air filter vacuum, drawing air, which can be used simultaneously with the compressor.
 (i) Inspections are completed to assure a dry piping system ready for the barrier coating and sealant.

Step Four—Piping System Profiling—Step 2 of Method of Corrosion Control and Leak Sealant 40

For step four, 40, the piping system is to be profiled, and can include:
 (a) Dried pipes can be profiled using an abrasive agent in varying quantities and types. The abrasive medium can be introduced into the piping system by the use of the moisture and oil free heated compressed air using varying quantities of air and varying air pressures. The amount of the abrading agent is controlled by the use of a pressure generator. The abrading agent is introduced into the air stream using a burst technique wherein small amounts of the abrasive are introduced into the air stream, travel through the pipe and exit, wherein the next amount or shot of abrasive is introduced.
 (b) The simultaneous use of the air filter vacuum at the exit end, drawing air to assist the compressor, reducing the effects of friction loss in the piping system, enhancing the effects of the sanding and debris removal.
 (c) The abraded pipe, when viewed without magnification, must be generally free of all visible oil, grease, dirt, mill scale, and rust. Generally, evenly dispersed, very light shadows, streaks, and discolorations caused by stains of mill scale, rust and old coatings can remain on no more than approximately 33 percent of the surface. Also, slight residues of rust and old coatings can be left in the craters of pits if the original surface is pitted.
 (d) Pipe profiling is completed to ready the pipe for the application of the barrier coating leak sealant material.
 (e) Visual inspections can be made at connection points and other random access areas of the piping system to assure proper cleaning and profiling standards are achieved.
 (f) An air flushing sequence is completed to the piping system to remove any residuals left in the piping system from the profiling stage.

Step Five—Corrosion Control Epoxy Sealing Leak Repair and Protection of the Piping—Step 3 of the Method of Corrosion Control and Leak Repair 50

For step five, 50, the piping system is protected with a barrier coating and leaks sealed and can include:
 (a) Piping system can be heated with hot, pre-filtered, moisture and oil free compressed air to an appropriate standard for an epoxy coating application. Pipes can be heated to approximately 25 to approximately 40 degrees Celsius (b) Piping system can be checked for leaks.

(c) If leaks are identified or are suspect and the approximate size determined the operator can choose to apply the coating material without fillers, if the leak is determined to be >approximately 30 mils in width the operator can decide to add fillers to the coating material, prior to injection into the piping system.

(d) Coating and leak sealing material can be prepared and metered to manufacturer's specifications using a proportionator.

(e) The barrier coating leak sealant and fillers are placed into the epoxy carrying tube or injection device.

(f) The coating and leak sealant material can be injected into the piping system using hot, pre-filtered, moisture and oil free compressed air at temperatures, air volume and pressure levels to distribute the epoxy barrier coating leak sealant throughout the pipe segment, in sufficient amounts to eliminate the water to pipe contact in order to create an epoxy barrier coating on the inside of the pipe and seal the leak in a single operation. During this wetting out stage a vacuum filter can be used in conjunction with the compressor to assist the wetting out of the coating material. At all times, a neutral or positive pressure must be maintained on the inside of the pipe.

(g) The coating can be applied to achieve a coating of at least approximately 4 mils and sealing leaks up to approximately 125 mils in size.

(h) Once the epoxy barrier coating leak sealant is injected and the piping segment is wetted out warm, pre-filtered, moisture and oil free compressed air can be applied to create a positive pressure inside the pipe with a continuous positive pressure maintained of at least approximately 1.5 P.S.I. over the internal surface of the pipe to achieve the initial set of the epoxy barrier coating sealant takes place. After initial set and still maintaining positive pressure confirm that all valves and pipe segments support appropriate air flow indicating clear passage of the air through the pipe i.e.: no areas of blockage. Allow the barrier coating leak sealant to cure to manufacturer's standards.

Step Six—System Evaluation and Re-Assembly 60

The final step six, 60 allows for restoring the piping system to operation and can include:

(a) Remove all process application fittings.

(b) Examine pipe segments to assure appropriate coating standards, checks to ensure all leaks are sealed.

(c) Re-confirm that all valves and pipe segments support appropriate air flow.

(d) Install original valves, fittings/fixtures, or any other fittings/fixtures as specified by building owner representative.

(e) Reconnect water system, and water supply.

(f) Complete system checks, testing and evaluation of the integrity of the piping system.

(g) Complete a water flush of system, according to manufacturer's specifications.

(h) Evaluate water flow and quality.

(i) Document piping layout schedule, and complete pipe labeling.

FIGS. 2A, 2B, 2C and 2D show a detailed process flowchart using the steps of FIG. 1 for cleaning the interior walls of the pipes and for providing the barrier coating leak sealant. These flow chart figures show a preferred method of applying a novel barrier coating leak sealant for the interior of small diameter piping systems following a specific breakdown of a preferred application of the invention.

Components in FIG. 3 will now be identified as follows:

| IDENTIFIER | EQUIPMENT |
| --- | --- |
| 100 | Compressors Outfitted with Aftercooler, Water separator, Fine Filter and Reheater (if required) |
| 200 | Main Air Header and Distributor (Main Header) |
| 300 | Floor (Mini) Manifold (optional) |
| 400 | Sander |
| 500 | Pre-Filter |
| 600 | Dust Collector System (Air Filter Vacuum) |
| 700 | Portable Epoxy Metering and Dispensing Unit (Epoxy Mixer) |
| 800 | Epoxy Barrier Coating and Sealant |
| 900 | Epoxy Carrying Tube - Injection Device |

Figure 3:
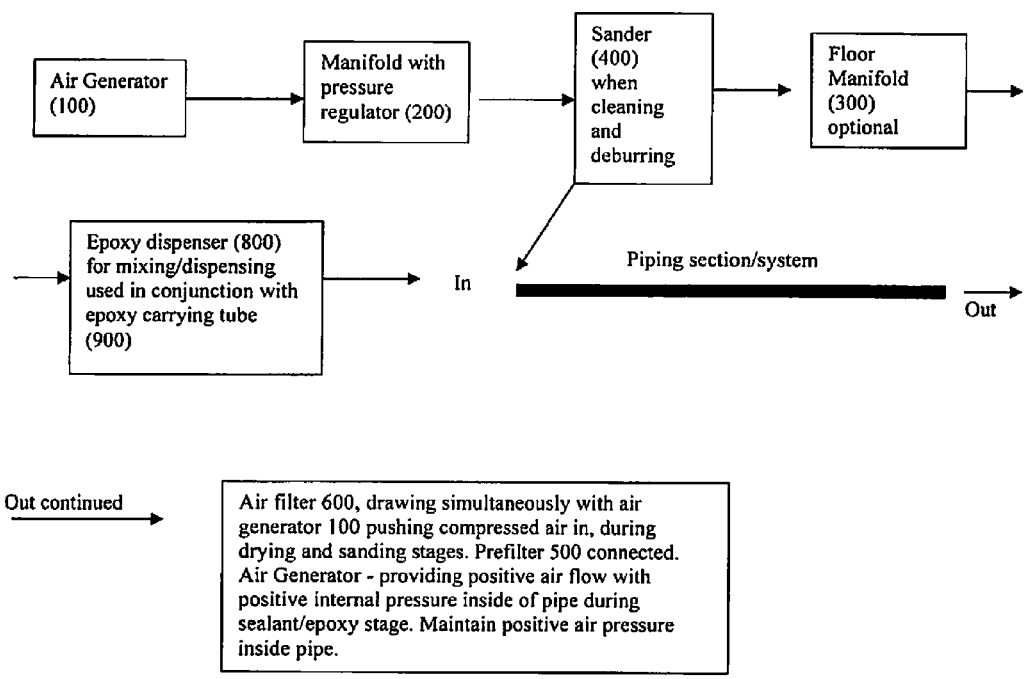
FIG. 3 shows a flow chart of the set up of the invention.

Referring to FIG. 3, components 100-900 can be located and used at different locations in or around a building. The invention allows for an entire isolated building piping system to be cleaned in one single pass through run without having to dismantle either the entire or multiple sections of the piping system. The piping system can include pipes having diameters of up to approximately 2 inches in diameter with the piping including bends up to approximately ninety degrees or more throughout the building and include at t-branches in the piping systems. The invention allows for an entire isolated building piping system to have the interior surfaces of the pipes cleaned, coated and leaks sealed in one single pass through run without having to dismantle either the entire or multiple parts of the piping system. Each of the components will now be defined.

100 Air Compressor

The air compressors 100 can provide filtered and heated compressed air. The filtered and heated compressed air employed in various quantities is used, to dry the interior of the piping system, as the propellant to drive the abrasive material used in cleaning of the piping system and is used as the propellant in the application of the epoxy barrier coating leak sealant and the drying of the epoxy barrier coating leak sealant once it has been applied. The compressors 100 also provide compressed air used to propel ancillary air driven equipment.

200 Main Air Header and Distributor

A main header and distributor 200 referred to in FIG. 3 can be one Manufactured By: Media Blast & Abrasives, Inc. 591 W. Apollo Street Brea, Calif. 92821.

The Main Header 200 provides safe air management capability from the air compressor for both regulated and unregulated air distribution (or any combination thereof) to the various other equipment components and to both the piping system risers and fixture outlets for a range of piping configurations in residential and/or commercial buildings that can range from a single family home to a multi-story building.

300 Floor (Mini) Manifold

A floor or mini manifold 300 can be one Manufactured By: M & H Machinery 45790 Airport Road, Chilliwack, BC, Canada As part of the general air distribution system set up, the floor manifolds 300 can be pressure rated vessels designed to evenly and quietly distribute the compressed air to at least 5 other points of connection, typically being the connections to the piping system. Airflow from each connection at the manifold is controlled by the use of individual full port ball valves.

400 Pressure Generator System-Sander

A pressure generator sander 400 that can be used with the invention can be one Manufactured By: Media Blast & Abrasives, Inc. 591 W. Apollo Street Brea, Calif. 92821.

The pressure generating sander system 400 can provide easy loading and controlled dispensing of a wide variety of abrasive medium. The pressure generator sander can include operational controls that allow the operator to easily control the amount of air pressure and control the quantity of the abrasive medium to be dispersed in a single or multiple application. The abrasive medium can be controlled in quantity and type and is introduced into a moving air steam, using small bursts of material, that is connected to a pipe or piping systems that are to be sand blasted clean by the abrasive medium. The abrasive medium can be introduced by the pressure generator sander system 400 by being connected to and be located outside of the piping system depicted in FIG. 3. The novel application of the sander system 400 allows for cleaning small pipes having diameters up to approximately 2 inches.

Table 1 shows a list of preferred dry particulate materials with their hardness ratings from 1 to 10 (being the hardest), and grain shapes that can be used with the sand generator 400, and Table 2 shows a list of preferred dry particulate particle sieve sizes that can be used with the invention.

TABLE 1

| PARTICULATES | | |
|---|---|---|
| Material | Moh Rating | Grain Shape |
| Silicon Carbide | 10 | Cubical |
| Aluminium Oxide | 9 | Cubical |
| Silica | 5 | Rounded |
| Garnet | 5 | Rounded |

Table 1 shows the hardness and shapes of the typical types of particulates used in the cleaning and sanding process. Based on the Moh scale of hardness, it is found that a 5 or higher hardness particulate can be used in this process. A particulate such as silicon carbide is recommended over a softer garnet particulate when used to clean and profile harder metal pipes, such as steel, where the metal is a softer, such as copper it can be cleaned and profiled with a less hard particulate such as garnet.

Silica, Garnet and Aluminum Oxide can be used to clean copper, preferably Garnet and Aluminum Oxide are most preferable since Aluminum Oxide is hard and Garnet is readily available and is environmentally desirable. The mesh size for particulates for copper pipes can be a range between 12 to 45 mesh sizes.

For cleaning steel pipes, Silica, Garnett, Silicon Carbide and Aluminum Oxide can be used. Preferably Silica, Silicon Carbide and Aluminum would be most preferable in view of the their hardness for steel pipes. The mesh size for particulates for steel pipes can be a range between 12 to 60 mesh sizes.

TABLE 2

| PARTICULATE SIZE | | | |
|---|---|---|---|
| | SIEVE SIZE OPENING | | |
| U.S. Mesh | Inches | Microns | Millimeters |
| 4 | .187 | 4760 | 4.76 |
| 8 | .0937 | 2380 | 2.41 |
| 16 | .0469 | 1190 | 1.20 |
| 25 | .0280 | 710 | .70 |
| 45 | .0138 | 350 | .35 |

Table 2 describes the various standards for measuring particulate size. In the cleaning and profiling stage an operator will decide to use particulate of various sizes depending on the size of pipe, the type of piping material i.e. steel or copper and the degree and type of build up inside the pipe. In a copper pipe situation it is common to use a 24 mesh size. When cleaning a heavily encrusted steel pipe an operator might use a small particulate such as a 45 or 60 mesh to bore a hole through the build up without getting clogged or plugged up inside the pipe. As the opening inside the pipe increases by the abrasive cleaning, larger particulate sizes can be used.

The following table 3 illustrates the approximate amount of pushing air volume and pressure ranges required for adequate cleaning of pipes in various diameters up to 2" when used in conjunction with a vacuum assist at the exit.

TABLE 3

| Pipe Size (inches) | Air Volume (CFM) | Pressure Ranges (bar) |
|---|---|---|
| 0.5 | 80 | 1.5-7.0 |
| 0.75 | 80 | |
| 1.00 | 80 | |
| 1.25 | 125 | |
| 1.50 | 175 | |
| 1.75 | 225 | |
| 2.00 | 275 | |

The following Table 4 illustrates the amount of abrasive material introduced into a metal piping system in the form of a shot or intermittent bursts to adequately profile the pipe for the barrier coating. Note: the number of shots depends on pressure applied, actual conditions of the pipe, degree of any existing buildup inside the pipe, length of pipe, # of angles ie: bends, hardness and type and size of abrasive. For this illustration the abrasive was aluminum oxide and the length of pipe was 30 meters for 25 mesh.

TABLE 4

| 25 mesh (.70 mm) Aluminum Oxide 9 Moh scale | | | |
|---|---|---|---|
| Pipe Size/type | Air Pressure | Abrasive per shot | # shots |
| 0.5" type/Cu | 2-3 bar | 25-80 grams | 6 |
| 0.5" type/galvanized | 3-6 bar | 25-80 grams | 12-16 |
| 0.5" type/CPVC, PEX | 3-6 bar | 25-80 grams | 12-16 |
| 0.75" type/Cu | 2-3 bar | 40-120 grams | 6 |
| 0.75" type/Galvanized | 3-6 bar | 40-120 grams | 12-16 |
| 0.75" type/CPVC, PEX | 3-6 bar | 40-120 grams | 12-16 |
| 1.00" type/Cu | 2-3 bar | 60-160 grams | 6 |
| 1.00" type/Galvanized | 3-6 bar | 60-160 grams | 14-16 |
| 1.00" type/CPVC, PEX | 3-6 bar | 60-160 grams | 14-16 |
| 1.5" type/Cu | 3-4 bar | 75-200 grams | 8 |
| 1.5" type/Galvanized | 4-7 bar | 75-200 grams | 16-20 |
| 1.5" type/CPVC, PEX | 4-7 bar | 75-200 grams | 16-20 |
| 1.75" type/Cu | 3-4 bar | 75-200 grams | 8 |
| 1.75" type/Galvanized | 4-7 bar | 75-200 grams | 16-20 |
| 1.75" type/CPVC, PEX | 4-7 bar | 75-200 grams | 16-20 |

Table 5 shows results for 16 mesh using Aluminum Oxide.

TABLE 5

16 mesh (1.20 m) Aluminum Oxide 9 Moh scale

| Pipe Size/type | Air pressure | Abrasive per shot | # of shots |
|---|---|---|---|
| 0.5" type Cu | 2-3 bar | 25-80 grams | 5 |
| 0.5" type/Galvanized | 3-6 bar | 25-80 grams | 10-12 |
| 0.5" type/CPVC, PEX | 3-6 bar | 25-80 grams | 10-12 |
| 0.75" type/Cu | 2-3 bar | 40-120 grams | 5 |
| 0.75" type/Galvanized | 3-6 bar | 40-120 grams | 10-12 |
| 0.75" type/CPVC, PEX | 3-6 bar | 40-120 grams | 10-12 |
| 1.00" type/Cu | 2-3 bar | 60-160 grams | 5 |
| 1.00" type/Galvanized | 3-6 bar | 60-160 grams | 14-16 |
| 1.00" type/CPVC, PEX | 3-6 bar | 60-160 grams | 14-16 |
| 1.5" type/Cu | 3-4 bar | 75-200 grams | 8 |
| 1.5" type/Galvanized | 4-7 bar | 75-200 grams | 16-20 |
| 1.5" type/CPVC, PEX | 4-7 bar | 75-200 grams | 16-20 |
| 1.75" type/Cu | 3-4 bar | 75-200 grams | 8 |
| 1.75" type/Galvanized | 4-7 bar | 75-200 grams | 16-20 |
| 1.75" type/CPVC, PEX | 4-7 bar | 75-200 grams | 16-20 |

Table 6 shows 12 mesh with Aluminum Oxide.

TABLE 6

12 mesh (1.68 mm) Aluminum Oxide 9 Moh scale

| Pipe Size/type | Air pressure | Abrasive per shot | # of shots |
|---|---|---|---|
| 0.5" type/Cu | 2-3 bar | 25-80 grams | 5 |
| 0.5" type/Galvanized | 3-6 bar | 25-80 grams | 10-12 |
| 0.5" type/CPVC, PEX | 3-6 bar | 25-80 grams | 10-12 |
| 0.75" type/Cu | 2-3 bar | 40-120 grams | 5 |
| 0.75" type/Galvanized | 3-6 bar | 40-120 grams | 10-12 |
| 0.75" type/CPVC, PEX | 3-6 bar | 40-120 grams | 10-12 |
| 1.00" type/Cu | 2-3 bar | 60-160 grams | 5 |
| 1.00" type/Galvanized | 3-6 bar | 60-160 grams | 14-16 |
| 1.00" type/CPVC, PEX | 3-6 bar | 60-160 grams | 14-16 |
| 1.5" type/Cu | 3-4 bar | 75-200 grams | 8 |
| 1.5" type/Galvanized | 4-7 bar | 75-200 grams | 16-20 |
| 1.5" type/CPVC, PEX | 4-7 bar | 75-200 grams | 16-20 |
| 1.75" type/Cu | 3-4 bar | 75-200 grams | 8 |
| 1.75" type/Galvanized | 4-7 bar | 75-200 grams | 16-20 |
| 1.75" type/CPVC, PEX | 4-7 bar | 75-200 grams | 16-20 |

500 Abrasive Reclaim Separator Module (Pre-Filter)

A pre-filter that can be used with the invention can be one Manufactured By: Media Blast & Abrasives, Inc. 591 W. Apollo Street Brea, Calif. 92821

During the pipe profiling stage, the Pre-Filter 500 allows the filtering of air and debris from the piping system. When used in conjunction with the dust collection equipment 600, fine dust particles and air are captured and filtered

600 Dust Collection Filter—Air Filter Vacuum

An example of an air filter vacuum 600 used with the invention can be one Manufactured By: Media Blast & Abrasives, Inc. 591 W. Apollo Street, Brea, Calif. 92821.

During the pipe profiling stage, the air filter vacuum or dust collector 600 is the final stage of the air filtration process. The dust collector 600 filters the passing air of fine dust and debris from the piping system after the contaminated air first passes through the pre-filter 500 (abrasive reclaim separator module).

During the drying stage the filter 600 can be used simultaneously with compressor 100 which aids in drawing air through the piping system. During the sanding or cleaning stage the filter 600 can be used with compressor 100 the filter 600 which assists by drawing air through the piping system. The filter 600 can be used simultaneously with compressor 100 to create a pressure differential in the piping system which is used to reduce the effects of friction loss and assists in a pulling action within the pipe during the drying and sanding or cleaning stages as well as the coating stage.

700 Portable Epoxy Metering and Dispensing Unit

A metering and dispensing unit 700 used with the invention can be one Manufactured by: Lily Corporation, 240 South Broadway, Aurora, Ill. 60505-4205.

The unit 700 can be very mobile and can be used both indoors and outdoors. The unit 700 requires only a single operator.

The epoxy 800 can be metered to control the amount of epoxy being dispensed.

800 Epoxy Barrier Coating Leak Sealant

A preferred epoxy barrier coating that can be used with the invention can be one Manufactured by: CJH, Inc. 2211 Navy Drive, Stockton, Calif. 95206. The barrier coating product used in this process can be a 2-part thermo set resin with a base resin and a base-curing agent.

The preferred thermo set resin is mixed as a two-part epoxy that is used in the invention. When mixed and applied, it forms a durable barrier coating leak sealant on pipe interior surfaces and other substrates. The barrier coating leak sealant provides a barrier coating that protects those coated surfaces from the effects caused by the corrosive activities associated with the chemistry of water and other reactive materials on the metal and other substrates and seal leaks in the pipe.

The epoxy barrier coating sealant can be applied to create a protective barrier coating and leak sealant to pipes ranging in size up to approximately 6" and greater. The barrier coating can be applied around bends intersections, elbows, tees, to pipes having different diameters and make up. The barrier coating leak sealant can be applied to pipes in any position e.g.: vertical or horizontal and can be applied as a protective coating leak sealant to metal and plastic type pipes used in fire sprinkler systems and natural gas systems. At least an approximately 4 mils coating layer can be formed on the interior walls of the pipes. The barrier coating leak sealant protects the existing interior walls and can also stop leaks in existing pipes which have small openings and cracks, and the like, of up to approximately 125 mils in size.

Although the process of application described in this invention includes application of thermo set resins other types of thermo set resins can be used.

For example, other thermo set resins can be applied in the process, and can vary depending upon viscosity, conditions for application including temperature, diameter of pipe, length of pipe, type of material pipe comprised of, application conditions, potable and non potable water carrying pipes, and based on other conditions and parameters of the piping system being cleaned, coated and leaks sealed by the invention.

Other thermo set type resins that can be used include but are not limited to and can be one of many that can be obtained by numerous suppliers such as but not limited to: Dow Chemical, Huntsmans Advances Material, formerly Ciba Giegy and Resolution Polymers, formerly Shell Chemical.

Fillers used in the process preferably can contain a mixture of low and high aspect ratio particles, acicular shaped particles, and plate like particles. The fillers can be inert material comprised of any one of the group of epoxy, glass, plastic foam parts, cork, clay.

Although the novel invention can be applied to all types of metal pipes such as but not limited to copper pipes, steel pipes, galvanized pipes, and cast iron pipes, the invention can be applied to pipes made of other materials such as but not limited to plastics, PEX (cross-linked polyethylene) type pipes, CPVC(Chlorinated Polyvinyl Chloride) type pipes, PVC (polyvinyl chloride), composite materials, polybutidylene, and the like.

Additionally, small cracks and holes in plastic type and metal pipes can also be fixed "in place" by the barrier coating leak sealant. A coating of at least approximately 4 mils on the interior pipe walls, can be used for sealing leaks up to approximately 125 mils in size.

Figure 4:
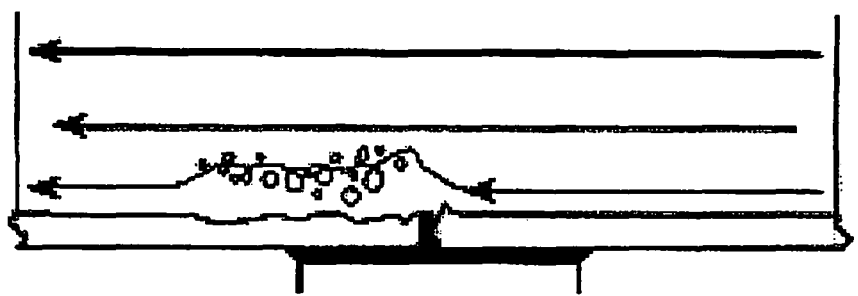
FIG. 4 shows an illustration of the effects of deburring and water turbulence, before and after the cleaning and coating process is used.
Figure 4:
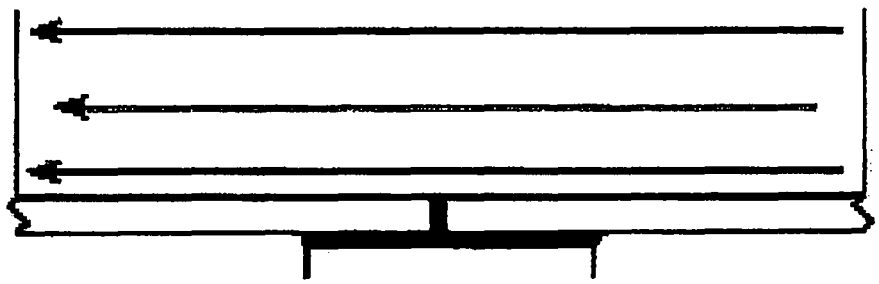

FIG. 4 shows an illustration of the effects of deburring and water turbulence, before and after the cleaning and coating process is used. Before the cleaning process, water turbulence can be created by water flowing against and over an unburred joint or excess solder at a joint, which can become further clogged and/or damaged as described above. With the subject invention cleaning operation, the burr or excess solder is reduced or eliminated in place, substantially improving water flow, flow of coating material and reducing effects of water turbulence, that can include excessive wear and damage. The abrasive technique in the subject invention greatly reduces or eliminates the lip(s) associated with undreamed or improperly reamed pipes.

Table 7 shows a comparison of prior art techniques (Japanese A-S Method Table 4-3 and NAF U.S. Pat. No. 5,007,461) compared to the novel ACE method described in the subject invention.

TABLE 7

| | | | Amount of Abrasive Used | | |
|---|---|---|---|---|---|
| Material | Diameter | Length | A-S Method | NAF | ACE Method |
| Steel Pipe | .5"-1" | 10-20 m | 5-10 kg | | .84-2.56 kg |
| Steel Pipe | 1.25"-1.75" | 20-30 m | 20-30 kg | | 1.2-4.0 kg |
| Steel Pipe | 1.00-1.5" | 70 m | | 200 kg | 1.2-4.0 kg |

The kg amounts are cumulative for the total amount of abrasive used.

In the subject invention, the unique combination of using small bursts of abrasive material combined with compressed air pushing and a vacuum pulling the material greatly improved the overall sanding performance. In the case of pipes having a diameter of 0.5" to 1" diameter, the invention can use 0.84 kg of abrasive compared to 5 kg used with the prior art, which makes the invention 5.95 times more efficient, and the invention can use up to 2.56 kg of abrasive compared to 10 kg with the prior art, which is 3.91 times more efficient. The invention ranges from being about 3.91 to about 5.95 times more efficient than the prior art.

In the case of 1.25" to 1.75" diameter pipes, the invention can use 1.2 kg of abrasive compared to 20 kg used with the prior art, which makes the invention 16.67 times more efficient, and the invention can use up to 4 kg of abrasive compared to 30 kg with the prior art, which is about 7.5 times more efficient. The invention ranges from being about 7.5 times to about 16.67 times more efficient than the prior art.

In addition the push/pull method also reduced the overall impact on the inside walls of the piping system. The operator noted that they were able to clean pipes using this method that had thinner side walls, resulting in less damage to the interior of the pipe when compared to the conventional streaming of larger qualities of abrasive into the one directional pushing air stream.

The use of burst sanding in which the abrasive material is sent through the pipe in smaller quantities and is allowed to exit before introducing the next burst makes the process more efficient, reduces the negative effects of simply adding a stream of material which in turn reduces the air flow and pressure inside the pipe which and reduces the impact associated with the abrasive material striking the inside walls of the pipe. The vacuum assists by reducing friction loss in the run of the pipe, assist as well by drawing debris and the abrasive out of the pipe.

The prior art NAF used 1 Bar, and A-S Method used 2.5-3 $kg/cm^2$ or 2.45-2.94 Bar. The subject invention's (ACE's) lower end of the scale air pressures were within the average range when compared to the A-S Method for respective pipe diameters i.e.: 3 bar on average, but the subject invention (ACE) used a vacuum drawing air to assist.

Although the preferred applications for the invention are described with building piping systems, the invention can have other applications such as but not limited to include piping systems for swimming pools, underground pipes, in-slab piping systems, piping under driveways, various liquid transmission lines, tubes contained in heating and cooling units, tubing in radiators, radiant in floor heaters, chillers and heat exchange units, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of cleaning out pipe systems, comprising the steps of:

generating pressurized gas into an end of a piping system having pipes to generate a moving air stream in the piping system;

intermittently injecting separate spaced apart bursts of abrasive particles into the moving air stream at the end of the piping system, with different cumulative amounts of the intermittent bursts of the abrasive particles that vary based on different piping diameters;

cleaning interior wall surfaces of the pipes with the intermittent bursts of the abrasive particles;

reducing at least one of burrs or interior lips in the interior wall surfaces of the pipes, with the intermittent bursts of the abrasive particles that have been intermittently injected into the end of the piping system; and removing abrasive particles and debris caused by each one of the separate burst shots of the abrasive particles.

2. The method of claim 1, wherein the intermittently injecting step includes the step of:

intermittently injecting the cumulative amount between approximately 0.15 kg to less than approximately 3 kg of the abrasive particulates for piping diameters of between approximately ⅜ inch to approximately 1 inch.

3. The method of claim 1, wherein the intermittently injecting step includes the step of:

intermittently injecting the cumulative amount between approximately 0.5 kg to less than 5 kg of the abrasive particulates for piping diameters of between approximately 1¼ inches to approximately 1¾ inches.

4. The method of claim 1, wherein the intermittently injecting step includes the step of:

intermittently injecting the cumulative amount between approximately 0.5 kg to less than 5 kg of the abrasive particulates for piping diameters of between approximately 1¾ inches to approximately 2 inches.

5. The method of claim 1, wherein the piping diameter is approximately ½ inch, with air pressure generated at approximately 2 to approximately 6 bar, and the abrasive particulates per shot are approximately 25 grams to approximately 80 grams.

6. The method of claim 1, wherein the piping diameter is approximately ¾ of an inch, with air pressure generated at approximately 2 to approximately 6 bar, and the abrasive particulates per shot are approximately 40 to approximately 120 grams.

7. The method of claim 1, wherein the piping diameter is approximately 1 inch, with air pressure generated at approximately 2 to approximately 6 bar, and the abrasive particulates per shot are approximately 60 to approximately 160 grams.

8. The method of claim 1, wherein the piping diameter is approximately 1½ of an inch, with air pressure generated at approximately 3 to approximately 7 bar, and the abrasive particulates per shot are approximately 75 to approximately 200 grams.

9. The method of claim 1, wherein the piping diameter is approximately 1¾ of an inch, with air pressure generated at approximately 3 to approximately 7 bar, and the abrasive particulates per shot are approximately 75 to approximately 200 grams.

* * * * *